(12) United States Patent
Egozy

(10) Patent No.: US 7,758,427 B2
(45) Date of Patent: *Jul. 20, 2010

(54) FACILITATING GROUP MUSICAL INTERACTION OVER A NETWORK

(75) Inventor: Eran Egozy, Cambridge, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/623,534

(22) Filed: Jan. 16, 2007

(65) Prior Publication Data

US 2008/0113797 A1    May 15, 2008

Related U.S. Application Data

(63) Continuation of application No. 11/560,195, filed on Nov. 15, 2006.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............. 463/42; 84/645; 84/609; 84/667; 463/7; 463/31; 463/35; 709/203; 709/217; 709/231

(58) Field of Classification Search ............ 463/25–28, 463/40–43; 84/609–612; 709/203
See application file for complete search history.

(56) References Cited

U.S. PATENT DOCUMENTS

| | | | | |
|---|---|---|---|---|
| 3,897,711 | A * | 8/1975 | Elledge | 84/479 R |
| 5,270,475 | A * | 12/1993 | Weiss et al. | 84/603 |
| 5,739,457 | A * | 4/1998 | Devecka | 84/743 |
| 6,009,457 | A * | 12/1999 | Moller | 709/203 |
| 6,011,212 | A * | 1/2000 | Rigopulos et al. | 84/667 |
| 6,031,174 | A * | 2/2000 | Takabayashi | 84/609 |
| 6,149,523 | A | 11/2000 | Yamada et al. | |
| 6,212,571 | B1 * | 4/2001 | Kikuchi et al. | 709/248 |
| 6,225,547 | B1 * | 5/2001 | Toyama et al. | 84/611 |
| 6,253,228 | B1 * | 6/2001 | Ferris et al. | 709/203 |
| 6,342,665 | B1 | 1/2002 | Okita et al. | |
| 6,343,315 | B1 * | 1/2002 | Stoel et al. | 709/204 |

(Continued)

FOREIGN PATENT DOCUMENTS

WO    WO 98/014898    4/1998

(Continued)

OTHER PUBLICATIONS

International Search Report for International Application No. PCT/US2007/084753, Date of Mailing May 20, 2008 (3 pages).

*Primary Examiner*—John M. Hotaling, II
*Assistant Examiner*—Paul A. D'Agostino
(74) *Attorney, Agent, or Firm*—Proskauer Rose LLP

(57) ABSTRACT

A method for providing real-time musical interaction among a plurality of players connected via a network includes the steps of receiving input from a local player representing a musical performance, generating audio output responsive to the received input, receiving second music performance data from a remote player representing a musical performance by the remote player, creating emulation data representing the remote musical performance, and using the emulation data to generate a local approximation of the remote musical performance.

17 Claims, 9 Drawing Sheets

U.S. PATENT DOCUMENTS

| | | | |
|---|---|---|---|
| 6,353,169 B1* | 3/2002 | Juszkiewicz et al. | 84/600 |
| 6,353,174 B1* | 3/2002 | Schmidt et al. | 84/609 |
| 6,482,087 B1 | 11/2002 | Egozy et al. | |
| 6,541,692 B2 | 4/2003 | Miller | |
| 6,645,067 B1* | 11/2003 | Okita et al. | 463/7 |
| 6,726,567 B1* | 4/2004 | Khosla | 463/42 |
| 6,897,779 B2* | 5/2005 | Nishitani et al. | 340/573.1 |
| 6,979,767 B2* | 12/2005 | Georges et al. | 84/609 |
| 6,985,966 B1* | 1/2006 | Gupta et al. | 709/248 |
| 7,044,857 B1* | 5/2006 | Klitsner et al. | 463/35 |
| 7,074,999 B2* | 7/2006 | Sitrick et al. | 84/477 R |
| 7,145,070 B2* | 12/2006 | Barry | 84/723 |
| 7,151,214 B2* | 12/2006 | Barry | 84/600 |
| 7,164,076 B2* | 1/2007 | McHale et al. | 84/616 |
| 7,206,811 B2* | 4/2007 | Skurikhin et al. | 709/205 |
| 7,277,958 B2* | 10/2007 | Chung et al. | 709/231 |
| 7,334,024 B2* | 2/2008 | Martino | 709/217 |
| 7,346,698 B2* | 3/2008 | Hannaway | 709/231 |
| 7,390,954 B2* | 6/2008 | Mizuno | 84/609 |
| 7,391,791 B2* | 6/2008 | Balassanian et al. | 370/503 |
| 7,405,355 B2* | 7/2008 | Both et al. | 84/645 |
| 7,467,184 B2* | 12/2008 | Donescu et al. | 709/203 |
| 2002/0007723 A1* | 1/2002 | Ludwig | 84/645 |
| 2002/0045484 A1* | 4/2002 | Eck et al. | 463/42 |
| 2002/0128736 A1* | 9/2002 | Yoshida et al. | 700/92 |
| 2002/0169014 A1* | 11/2002 | Egozy et al. | 463/7 |
| 2004/0154461 A1 | 8/2004 | Havukainen et al. | |
| 2005/0214728 A1* | 9/2005 | Kikuchi et al. | 434/307 R |
| 2007/0000374 A1* | 1/2007 | Clark et al. | 84/724 |
| 2007/0140510 A1* | 6/2007 | Redmann | 381/97 |
| 2007/0163427 A1* | 7/2007 | Rigopulos et al. | 84/609 |
| 2007/0191401 A1* | 8/2007 | Albert et al. | 514/266.2 |

FOREIGN PATENT DOCUMENTS

WO    WO 2005/113096    12/2005

* cited by examiner

FACILITATING GROUP MUSICAL INTERACTION OVER A NETWORK

RELATED APPLICATIONS

This application is a continuation of U.S. patent application Ser. No. 11/560,195 filed on Nov. 15, 2006, and titled "METHOD AND APPARATUS FOR FACILITATING GROUP MUSICAL INTERACTION OVER A NETWORK."

FIELD OF THE INVENTION

This invention relates to electronic music systems and, more particularly, to an electronic music system by which game players interact musically with one another in real-time over a network.

BACKGROUND OF THE INVENTION

Music is a temporal medium, the organization of sound in time. Accordingly, music making is highly timing sensitive. When a musician presses a key on a piano, the musician expects the result to be immediately audible. Any delay in hearing the sound, even as brief as few milliseconds, produces a perceived sluggishness that impedes the ability of the musician to use the instrument.

Music making is also often a collaborative effort among many musicians who interact with each other. One form of musical interaction popular among non-musicians is provided by a video game genre known as "rhythm-action," which requires a player to perform phrases from a pre-recorded musical composition using the video game's input device to simulate a musical instrument. The best-known example of this genre is the BEATMANIA series of games published by Konami Co., Ltd. of Japan. An example of the game environment provided by BEATMANIA is shown in FIG. 1. In this series of games the notes in musical phrases are graphically displayed to the player as a series of visual markers 104 spaced along one or more timelines 110, 120, 130, 140; each marker 104 corresponds to one note in the phrase. In the environment shown in FIG. 1 the visual markers move from the top of the display to the bottom of the display. As each marker 104 on the scrolling timelines passes a graphical cursor 108 displayed along this timeline, the player must simultaneously press a button on the input device corresponding to the correct timeline to play the sound of the corresponding note at the correct time. If the player performs this action successfully for a sufficient percentage of the notes, he scores well and wins the game. If the player fails to perform this action successfully for a sufficient percentage of the notes, he scores poorly and loses the game. Two or more players may compete against each other, typically by each one attempting to play back different, parallel musical phrases from the same song simultaneously (shown in FIG. 1). The player who plays the highest percentage of notes correctly achieves the highest score and wins.

Multiplayer gaming increasingly incorporates various networking technologies that allow multiple players to compete against each other from remote physical locations via networks, and networked multiplayer gaming has become extremely popular. Unfortunately, however, the latency inherent in networked communication imposes a significant engineering and design burden on video game developers: data signals are often subject to large and unpredictable transmission delays. These transmission delays do not significantly impact turn-based games (such as chess) or other game genres in which timing sensitivity is not critical to gameplay. In action games and other "real-time" games, however, gameplay is extremely sensitive to the timing of various events, and transmission delays inherently result in inconsistencies continually forming between the local game states of the various players of a networked game. Consequently, developers of timing-sensitive networked games have had to invent various methods for gracefully performing "conflict resolution" to resolve divergent local game states.

The rhythm-action genre has a unique attribute, however, that makes traditional conflict resolution methods inapplicable. Specifically, the core activity of multiplayer rhythm-action involves simultaneous music-making, which is highly timing sensitive, by two or more players. If these two players are separated by a network, the data representing musical notes played by one player will incur transmission delays when being sent to the other player. If note data were simply transmitted to a receiving machine it would trigger corresponding audio that would sound "out of sync" to the receiving player, resulting in cacophony. One solution to this problem would be to mute the audio from remote players on the local player's machine. However, this would significantly degrade the entertainment value of the game experience by destroying musical communication between the players.

Therefore, a need exists for a system and method that enable musicians to achieve the experience of real-time musical interaction over a high-latency network, such as the Internet.

SUMMARY OF THE INVENTION

It is an object of the invention to provide a system and method that a group individuals connected to a network can use to compete with one another in real time in a rhythm-action game.

In one aspect, the present invention relates to a method for facilitating real-time interaction between players of a game. First music performance input data is received from a local player, the first music performance input data representing a first musical performance. Audio output responsive to the received first music performance input is generated. Second music performance input data from a remote player is received via a network. The received second music performance input data represents a musical performance by the remote player. Emulation data is created from the received second music performance input data and a local approximation of the remote musical performance is generated using the emulation data. The local approximation of the remote musical performance is synchronous with the local musical performance.

In some embodiments, the music performance input data is generated by a local player using a gamepad, a simulated musical instrument, a simulated guitar, a simulated drum, a simulated musical keyboard, a simulated turntable, or a simulated microphone. In other embodiments a note to indicate a successful input or an error tone is sounded to indicate unsuccessful input. In still other embodiments, second music performance input data from a remote player is received from an interim server between the two players. The received second music performance input data represents a musical performance by the remote player.

In still other embodiments the emulation data is created by performing a moving average of timing deltas between received second music performance events or by performing a moving average of received second music performance events.

In another aspect, the present invention relates to a method for facilitating real-time interaction between players of a game. Music performance input data from a remote player is received over a network. The received music performance input data represents a musical performance by the remote player. Emulation data from the received music performance input data is created and a local approximation of the remote musical performance is created using the emulation data. The local approximation is synchronous with a local musical performance.

In some embodiments, the received music performance input data represents a musical performance by the remote player and is received from an interim server. In other embodiments, the emulation data is created by performing a moving average of timing deltas between received music performance events or a moving average of received music performance events.

In still another aspect, the present invention relates to a system for facilitating real-time interaction between players of a game. The system includes: means for receiving first music performance input data from a local player, the first music performance input data representing a first musical performance; means for generating audio output responsive to the received first music performance input; means for receiving, via a network, second music performance input data from a remote player, the received second music performance input data representing a musical performance by the remote player; means for creating emulation data from the received second music performance input data; and means for generating a local approximation of the remote musical performance using the emulation data, the local approximation synchronous with the local musical performance.

In some embodiments, the means for receiving first music performance input data comprises a simulated musical instrument, a simulated guitar, a simulated drum, a simulated musical keyboard, a simulated turntable, or a simulated microphone. In other embodiment, the means for generating audio output plays a note to indicate a successful input or plays an error tone to indicate unsuccessful input.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
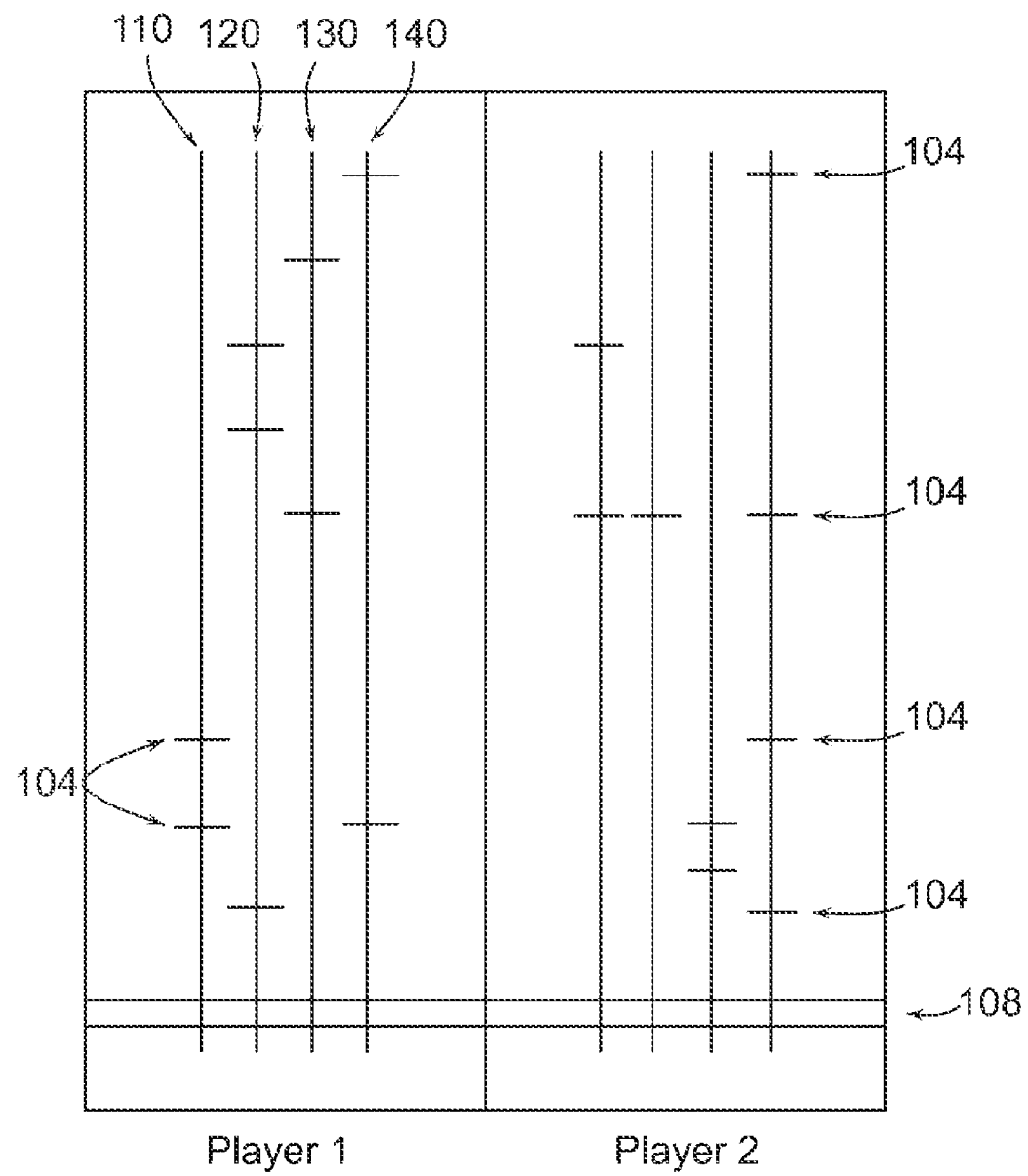
FIG. 1 is a block diagram depiction of one embodiment of a rhythm-action game environment.
Figure 2:
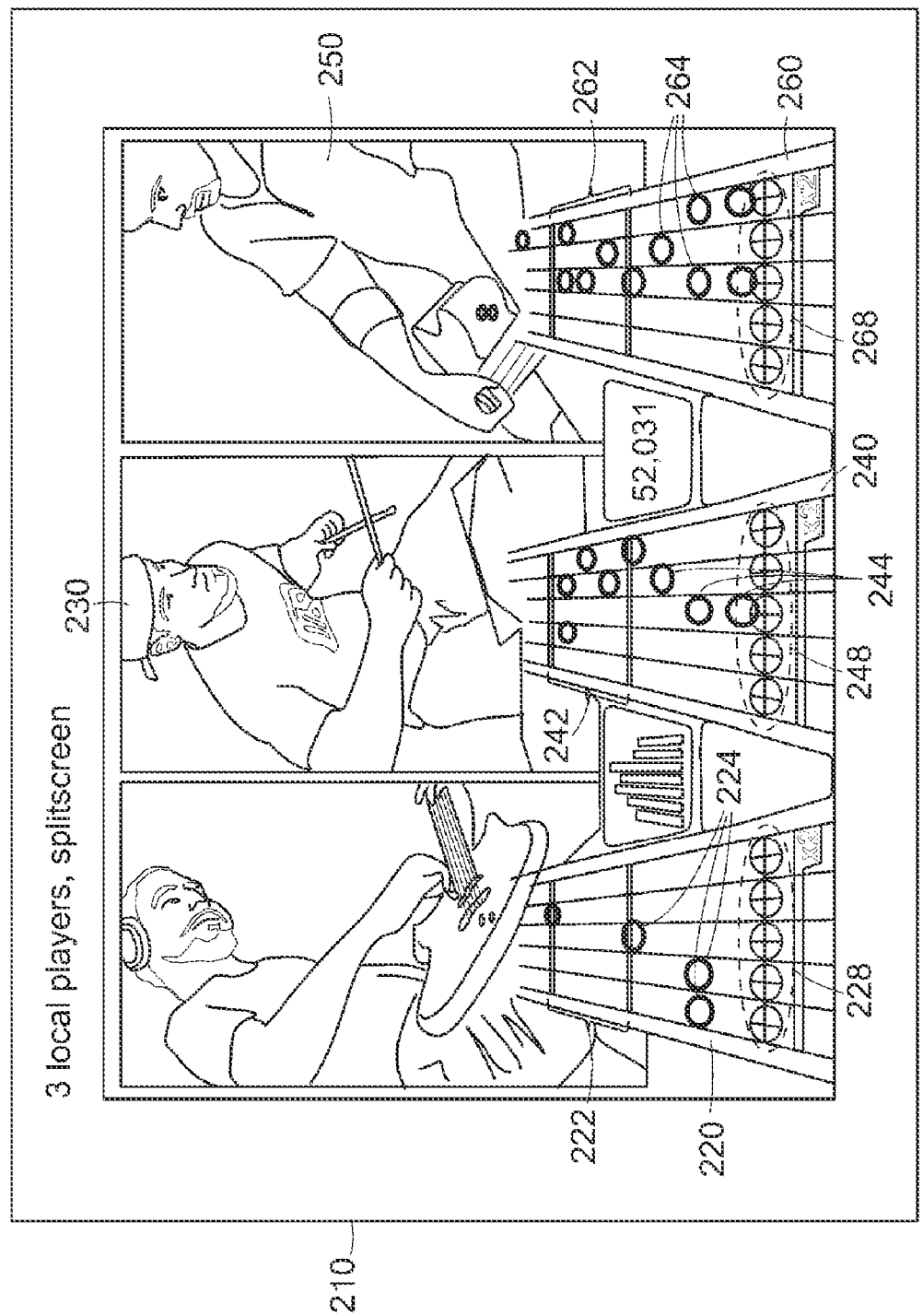
FIG. 2 is a screen shot depicting one embodiment of a screen display for a video game in which three players emulate a musical performance.

Referring now to FIG. 2, an embodiment of a screen display for a video game in which three players emulate a musical performance is shown. Each player is represented on screen by an avatar 210, 230, 250. Although FIG. 2 depicts an embodiment in which three players participate, any number of players may participate simultaneously. For example, a fourth player may join the game as a keyboard player. In this case, the screen would be further subdivided to make room to display a fourth avatar. In some embodiments, the avatar 210, 230, 250 may be a computer-generated image. In other embodiments, the avatar may be a digital image, such as a video capture of a person. The avatar may be modeled on a famous figure or, in some embodiments, the avatar may be modeled on the game player associated with the avatar. As shown in FIG. 2, each avatar 210, 230, 250 associated with a player is associated with a "lane" 220, 240, 260 that appears to be three-dimensional, that is, it appears to lie in a plane between the player of the game and one of the avatars.

Although depicted in FIG. 2 as a lane, in some embodiments (not shown), instead of a lane extending from a player's avatar 210, 230, 250, a three-dimensional "tunnel" comprising a number of lanes extends from the a player's avatar. The tunnel may have any number of lanes and, therefore, may be triangular, square, pentagonal, sextagonal, septagonal, octagonal, nonanogal, or any other closed shape. In still other embodiments, the lanes do not form a closed shape. The sides may form a road, trough, or some other complex shape that does not have its ends connected. For ease of reference throughout the remainder of the document, the game element extending from an avatar 210, 230, 250, whatever its configuration, will be referred to as a "lane."

In some embodiments, the spatial lane does not extend perpendicularly from the image plane of the display but instead extends obliquely from the image plane of the display. In further embodiments, the lane may be curved or may be some combination of curved portions and straight portions. In still further embodiments, the lane may form a closed loop through which the viewer may travel, such as a circular or ellipsoid loop.

As shown in FIG. 2, each lane may be subdivided into a plurality of segments 222, 242, 262. Each segment may correspond to some unit of musical time, such as a beat, a plurality of beats, a measure, or a plurality of measures. Although the embodiment shown in FIG. 2 show equally-sized segments, each segment may have a different length depending on the particular musical data to be displayed. As shown in FIG. 2, in addition to musical data, each segment may be textured or colored to enhance the interactivity of the display. For embodiments in which a lane comprises a tunnel or other shape (as described above), a cursor is provided to indicate which surface is "active," that is, with which lane surface a player is currently interacting. In these embodiments, the viewer can use an input device to move the cursor from one surface to another.

It should be understood that the display of three-dimensional "virtual" space is an illusion achieved by mathematically "rendering" two-dimensional images from objects in a three-dimensional "virtual space" using a "virtual camera,"

just as a physical camera optically renders a two-dimensional view of real three-dimensional objects. Animation may be achieved by displaying a series of two-dimensional views in rapid succession, similar to motion picture films that display multiple still photographs per second.

To generate the three-dimensional space, each object in the three-dimensional space is typically modeled as one or more polygons, each of which has associated visual features such as texture, transparency, lighting, shading, anti-aliasing, z-buffering, and many other graphical attributes. The combination of all the polygons with their associated visual features can be used to model a three-dimensional scene. A virtual camera may be positioned and oriented anywhere within the scene. In many cases, the camera is under the control of the viewer, allowing the viewer to scan objects. Movement of the camera through the three-dimensional space results in the creation of animations that give the appearance of navigation by the user through the three-dimensional environment.

A software graphics engine may be provided which supports three-dimensional scene creation and manipulation. A graphics engine generally includes one or more software modules that perform the mathematical operations necessary to "render" the three-dimensional environment, which means that the graphics engine applies texture, transparency, and other attributes to the polygons that make up a scene. Graphic engines that may be used in connection with the present invention include Gamebryo, manufactured by Emergent Game Technologies of Calabasas, Calif., the Unreal Engine, manufactured by Epic Games, and Renderware, manufactured by Criterion Software of Austin, Tex. In other embodiments, a proprietary graphic engine may be used. In many embodiments, a graphics hardware accelerator may be utilized to improve performance. Generally, a graphics accelerator includes video memory that is used to store image and environment data while it is being manipulated by the accelerator.

In other embodiments, a three-dimensional engine may not be used. Instead, a two-dimensional interface may be used. In such an embodiment, video footage of a band can be used in the background of the video game. In others of these embodiments, traditional two-dimensional computer-generated representations of a band may be used in the game. In still further embodiments, the background may only slightly related, or unrelated, to the band. For example, the background may be a still photograph or an abstract pattern of colors. In these embodiments, the lane 220, 240, 260 may be represented as a linear element of the display, such as a horizontal, vertical or diagonal element.

Referring back to FIG. 2, a lane 220, 240, 260 has one or more game "cues", "elements" or "gems" 224, 244, 264 corresponding to musical events distributed along the lane 220, 240, 260. During gameplay, the cues appear to flow away from an avatar 210, 230, 250 and toward a game player. The cues 224, 244, 264 are distributed on the lane 220, 240, 260 in a manner having some relationship to musical content associated with the game level. For example, the cues may represent note information (gems spaced more closely together for shorter notes and further apart for longer notes, pitch (gems placed on the left side of the lane for notes having lower pitch and the right side of the lane for higher pitch), volume (gems may glow more brightly for louder tones), duration (gems may be "stretched" to represent that a note or tone is sustained), articulation, timbre or any other time-varying aspects of the musical content. Although shown in FIG. 2 as a circular element, the game elements 224, 244, 264 may be any geometric shape, and may have other visual characteristics, such as transparency, color, or variable brightness.

As the game elements 224, 244, 264 move along a respective lane 220, 240, 260, musical data represented by the game elements 224, 244, 264 may be substantially simultaneously played as audible music. In some embodiments, audible music represented by a game element 224, 244, 264 is only played (or only played at full or original fidelity) if a player successfully "performs the musical content" by capturing or properly executing the game element 224, 244, 264. In some embodiments, a musical tone is played to indicate successful execution of a musical event by a player. In other embodiments, a stream of audio is played to indicate successful execution of a musical event by a player. In certain embodiments, successfully performing the musical content triggers or controls the animations of the avatars 210, 230, 250. In other embodiments, the audible music, tone, or stream of audio represented by a game element 224, 244, 264 is modified, distorted, or otherwise manipulated in response to the player's proficiency in executing game elements associated with a lane 220, 240, 260. For example, various digital filters can operate on the audible music, tone, or stream of audio prior to being played by the game player. Various parameters of the filters can be dynamically and automatically modified in response the player capturing game elements associated with a lane 220, 240, 260, allowing the audible music to be degraded if the player performs poorly or enhancing the audible music, tone, or stream of audio if the player performs well. For example, if a player fails to execute a game event, the audible music, tone, or stream of audio represented by the failed event may be muted, played at less than full volume, or filtered to alter the its sound. In certain embodiments, a "wrong note" sound may be substituted for the music represented by the failed event. Conversely, if a player successfully executes a game event, the audible music, tone, or stream of audio may be played normally. In some embodiments, if the player successfully executes several, successive game events, the audible music, tone, or stream of audio associated with those events may be enhanced, for example, by adding an echo or "reverb" to the audible music. The filters can be implemented as analog or digital filters in hardware, software, or any combination thereof. Further, application of the filter to the audible music output, which in many embodiments corresponds to musical events represented by game elements 224, 244, 264, can be done dynamically, that is, during play. Alternatively, the musical content may be processed before game play begins. In these embodiments, one or more files representing modified audible output may be created and musical events to output may be selected from an appropriate file responsive to the player's performance.

In addition to modification of the audio aspects of game events based on the player's performance, the visual appearance of those events may also be modified based on the player's proficiency with the game. For example, failure to execute a game event properly may cause game interface elements to appear more dimly. Alternatively, successfully executing game events may cause game interface elements to glow more brightly. Similarly, the player's failure to execute game events may cause their associated avatar 210, 230, 250 to appear embarrassed or dejected, while successful performance of game events may cause their associated avatar 210, 230, 250 to appear happy and confident. In other embodiments, successfully executing game elements associated with a lane 220, 240, 260 causes the avatar 210, 230, 250 associated with that lane 220, 240, 260 to appear to play an instrument, for example, the drummer avatar 230 will appear to strike the correct drum for producing the audible music. Successful execution of a number of successive game elements, or notes, may cause the corresponding avatar 210, 230, 250 to execute a "flourish," such as kicking their leg, pumping their fist, performing a guitar "windmill," spinning around, winking at the "crowd," or throwing drum sticks.

Player interaction with the game element 224, 244, 264 may be required in a number of different ways. In general, the player is required to provide input when a game element 224, 244, 264 passes under or over a respective one of a set of target markers 228, 248, 268 disposed on the lane 220, 240, 260. For example, the player associated with avatars 210 (lead guitar) or avatar 250 (bass guitar) may use a specialized controller to interact with the game that simulates a guitar, such as a Guitar Hero SG Controller, manufactured by RedOctane of Sunnyvale, Calif. In this embodiment, the player executes the game element by activating the "strum bar" while pressing the correct fret button of the controller when the game element 224, 264 passes under the target markers 228, 268. In other embodiments, the player may execute a game element by performing a "hammer on" or "pull off," which requires quick depression or release of a fret button without activation of the strum bar. In other embodiments the player may be required to perform a game element using a "whammy bar" provided by the guitar controller. For example, the player may be required to bend the pitch of note represented by a game element using the whammy bar. In some embodiments, the guitar controller may also use one or more "effects pedals," such as reverb or fuzz, to alter the sound reproduced by the gaming platform.

The player associated with the middle avatar 230 (drummer) may also use a specialized controller to interact with the game that simulates a drum kit, such as the DrumMania drum controller, manufactured by Topway Electrical Appliance Co., Ltd. of Shenzhen, China. In some embodiments, the drum controller provides four drum pads and a kick drum. In other embodiments, the drum controller surrounds the player, as a "real" drum kit would do. In still other embodiments, the drum controller is designed to look and feel like an analog drum kit. In these embodiments, a game element may be associated with a particular drum. The player strikes the indicated drum when the game element 244 passes under the target marker 248, to successfully execute game element 244. In other embodiments, a player may use a standard game controller to play, such as a DualShock game controller, manufactured by Sony Corporation.

In some embodiments, a player is associated with a "turntable" or "scratch" track. In these embodiments, the player may provide input using a simulated turntable such as the turntable controller sold by Konami Corporation.

Figure 3:
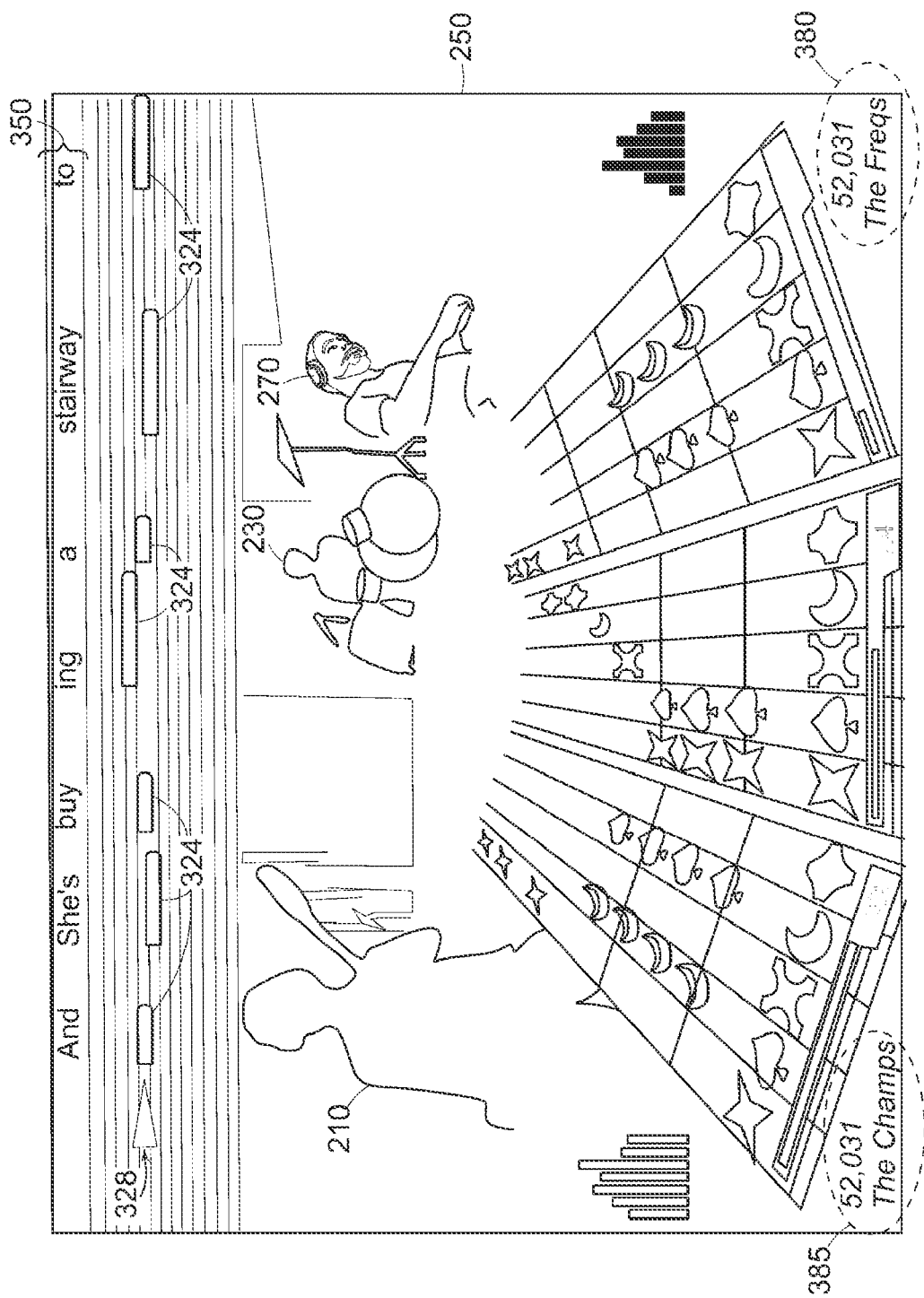
FIG. 3 is a screen shot depicting one embodiment of a screen display for a video game in which a player emulates a musical performance by providing vocal input.

Referring now to FIG. 3, a screen shot depicting one embodiment of a screen display for a video game in which a player emulates a musical performance by providing vocal input is shown. A player associated with avatar 270 provides vocal input matching the pitch and duration of notes included in musical content associated with the game. As shown in FIG. 3, the notes of a vocal track are represented by "note tubes" 324. In the embodiment shown in FIG. 3, the note tubes 324 appear above the player's avatar 270 and flow horizontally, from right to left, as the musical content progresses. In this embodiment, vertical position of a note tube 324 represents the pitch to be sung by the player; the length of the note tube indicates the duration for which the player must hold that pitch. The arrow 328 provides the player with visual feedback regarding the pitch of the note that is currently being sung. If the arrow is above the note tube 324, the player needs to lower the pitch of the note being sung. Similarly, if the arrow 328 is below the note tube 324, the player needs to raise the pitch of the note being sung. In these embodiments, the player associated with avatar 270 may provide vocal input using a USB microphone of the sort manufactured by Logitech International of Switzerland. In other embodiments, the player associated with avatar 270 may provide vocal input using another sort of simulated microphone. In still further embodiments, the player associated with avatar 270 may provide vocal input using a traditional microphone commonly used with amplifiers. As used herein, a "simulated microphone" is any microphone apparatus that does not have a traditional XLR connector. As shown in FIG. 3, lyrics 350 may be provided to the player to assist their performance.

Figure 4A:
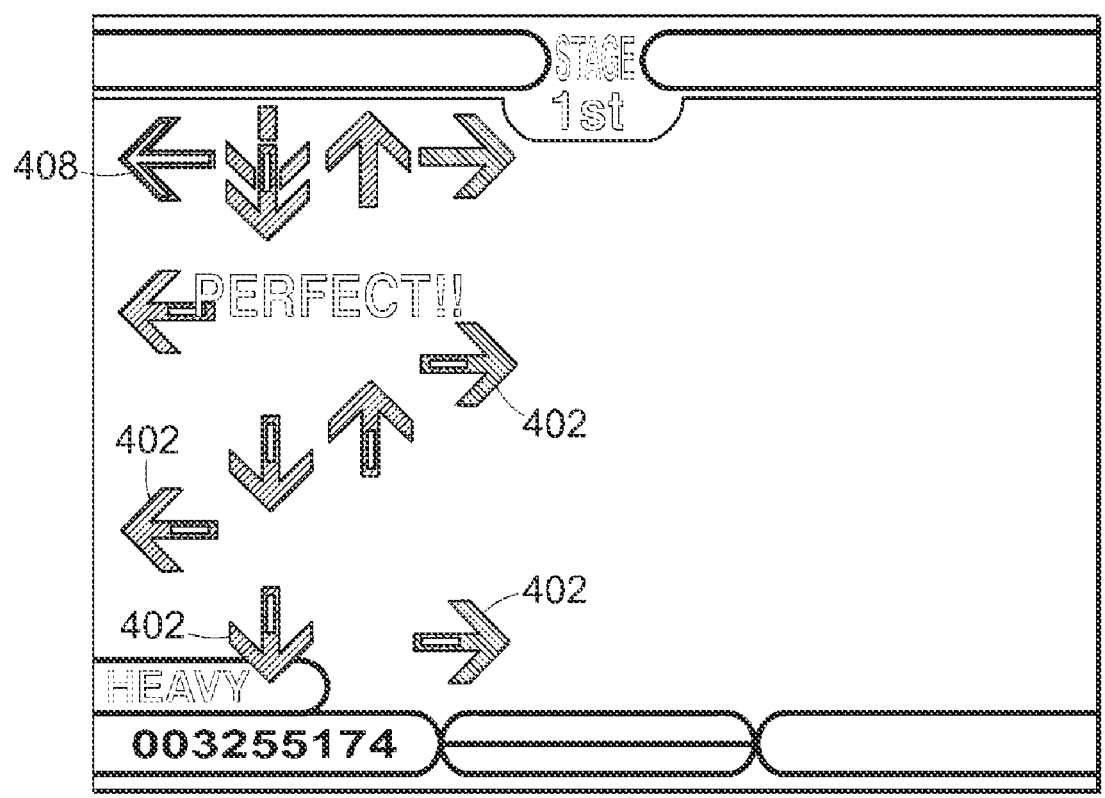
FIG. 4A is a screen shot depicting one embodiment of a screen display for a video game in which a player emulates a performance by providing dance input.
Figure 4B:
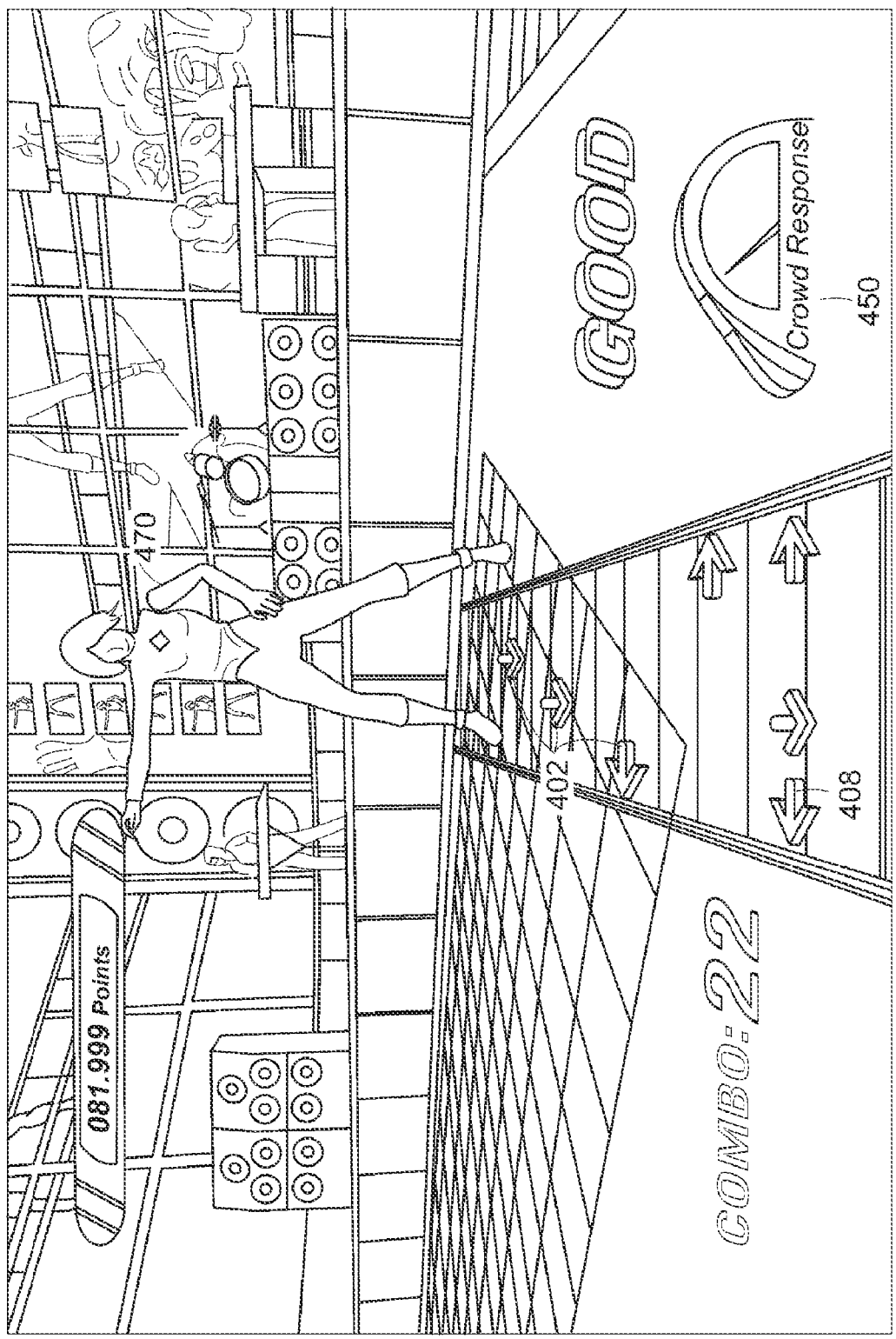
FIG. 4B is a screen shot depicting another embodiment of a screen display for a video game in which a player emulates a performance by providing dance input.

In other embodiments, a player may interact with the game and cooperate or compete with other players by executing specific dance moves in synchrony with music content. As shown in FIG. 4A, specific dance moves may be indicated to the player as directional arrows 402 on the side of the game screen. Each directional arrow represents a dance "step," such as step forward, step left, step right or step back. In other embodiments, the directional arrows appear on a lane associated with an on-screen avatar. In these embodiments, a player is directed to execute the identified dance step when the directional arrow 402 passes under a target marker 408. In this manner, the player "dances" with the musical content. FIG. 4B depicts another embodiment of a screen display in which a player instructed to execute specific dance moves in synchrony with music content. In the embodiment shown in FIG. 4B, directional arrows 402 travel toward a player on a lane 450. The player must execute the indicated dance step when directional arrow 402 passes over or below target marker 408. As shown in FIG. 4B, the player's avatar 470 may be animated to perform dance moves with the avatar's upper body. Upper body movements may be controlled by how well the player executes the indicated dance moves or they may be predetermined for certain points in the music content. In embodiments in which the gaming platform is provided with a camera, the camera may be used to capture movements of the player. In other embodiments, the player's steps are captured by a floor pad connected to the gaming platform, such as the RedOctane Ignition Pad 3.0, manufactured by RedOctane of Sunnyvale, Calif.

Although described above in the context of a single player providing a single type of input, a single player may provide one or more types of input simultaneously. For example, a single player may provide dance and vocal input simultaneously. Another example is a single player providing instrument-based input (such as for a lead guitar track, bass guitar track, rhythm guitar track, keyboard track, drum track, or other percussion track) and vocal input simultaneously. As another example, a single player may provide instrument-based input (such as for a lead guitar track, bass guitar track, rhythm guitar track, keyboard track, drum track, or other percussion track) and dance input simultaneously.

Referring back to FIGS. 2 and 3, each player uses a gaming platform in order to participate in the game. In one embodiment, the gaming platform is a dedicated game console, such as: PLAYSTATION2, PLAYSTATION3, or PLAYSTATION PERSONAL, manufactured by Sony Corporation; DREAMCAST, manufactured by Sega Corp.; GAMECUBE, GAMEBOY, GAMEBOY ADVANCE, or WII, manufactured by Nintendo Corp.; or XBOX or XBOX360, manufactured by Microsoft Corp. In other embodiments, the gaming platform comprises a personal computer, personal digital assistant, or cellular telephone. In some embodiments, the players associated with avatars 210, 230, 250, 270 may be physically proximate to one another. For example, each of the players associated with the avatars 210, 230, 250, 270 may connect their respective game controllers into the same gaming platform ("local play").

Local play may be competitive or it may be cooperative. Cooperative play is when two or more players work together in an attempt to earn a combined score. Competitive play is when a player competes against another player in an attempt to earn a higher score. In other embodiments, competitive play involves a team of cooperating players competing against another team of competing players in attempt to achieve a higher team score than the other team. Competitive local play may be head-to-head competition using the same instrument, head-to-head competition using separate instruments, simultaneous competition using the same instrument, or simultaneous competition using separate instruments.

Figure 5A:
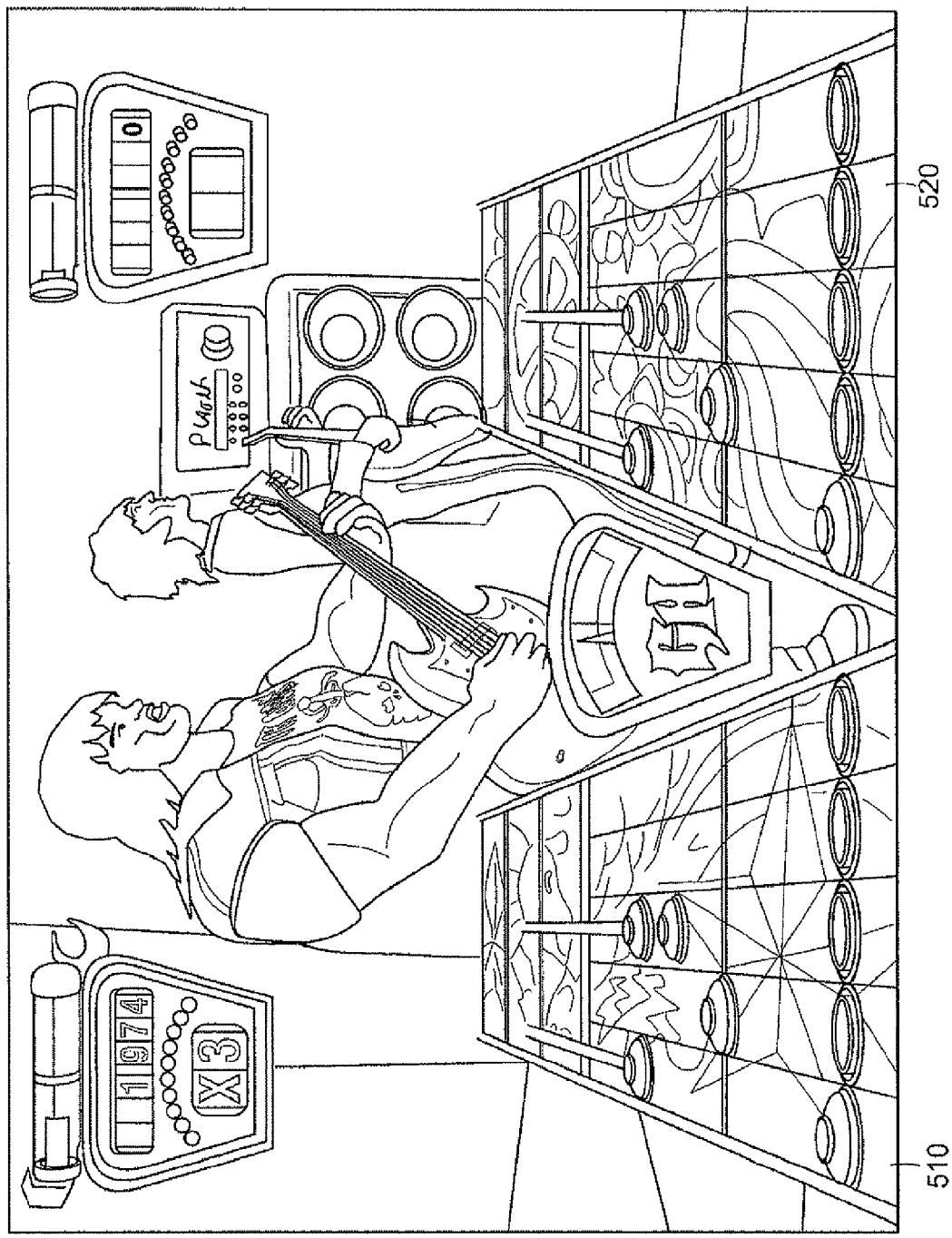
FIG. 5A is a screen shot depicting one embodiment of competitive play.

In one embodiment, competition in local play occurs when two or more players use the same type of instrument controller to play the game, for example, guitar controllers. One embodiment of such competition is depicted in FIG. 5A. In some embodiments, each player associates themselves with a band in order to begin play. In other embodiments, each player can simply play "solo," without association with a band. In these embodiments, the other instruments required for performance of a musical composition are reproduced by the gaming platform. Each of the players has an associated lane 510, 520 and each player is alternately required to perform a predetermined portion of the musical composition. Each player scores depending on how faithfully he or she reproduces their portions of the musical composition. In some embodiments, scores may be normalized to produce similar scores and promote competition across different difficulty levels. For example, a guitarist on a "medium" difficulty level may be required to perform half of the notes as a guitarist on a "hard" difficulty level and, as such, should get 100 points per note instead of 50. An additional per-difficulty scalar may be required to make this feel "fair."

This embodiment of head-to-head play may be extended to allow the players to use different types of game controllers and, therefore, to perform different portions of the musical composition. For example, one player may elect to play using a guitar-type controller while a second player may play using a drum-type controller. Alternatively, each player may use a guitar-type controller, but one player elects to play "lead guitar" while the other player elects to play "rhythm guitar" or, in some embodiments, "bass guitar." In these examples, the gaming platform reproduces the instruments other than the guitar when it is the first player's turn to play, and the lane associated with the first player is populated with gems representing the guitar portion of the composition. When it is time for the second player to compete, the gaming platform reproduces the instruments other than, for example, the drum part, and the second player's lane is populated with gems representing the drum portion of the musical composition. In some of these embodiments, a scalar factor may be applied to the score of one of the player's to compensate for the differences in the parts of the musical composition.

In still other embodiments, the players may compete simultaneously, that is, each player may provide a musical performance at the same time as the other player. In some embodiments, both players may use the same type of controller. In these embodiments, each player's lane provides the same pattern of game elements and each player attempts to reproduce the musical performance identified by those elements more faithfully than the other player. In other embodiments, the players use different types of controllers. In these embodiments, one player attempts to reproduce one portion of a musical composition while the other player tries to represent a different portion of the same composition.

In any of these forms of competition, the relative performance of a player may affect their associated avatar. For example, the avatar of a player that is doing better than the competition may, for example, smile, look confident, glow, swagger, "pogo stick," etc. Conversely, the losing player's avatar may look depressed, embarrassed, etc.

Instead of competing, the players may cooperate in an attempt to achieve a combined score. In these embodiments, the score of each player contributes to the score of the team, that is, a single score is assigned to the team based on the performance of all players. As described above, a scalar factor may be applied to the score of one of the player's to compensate for the differences in the parts of the musical composition.

Figure 5B:
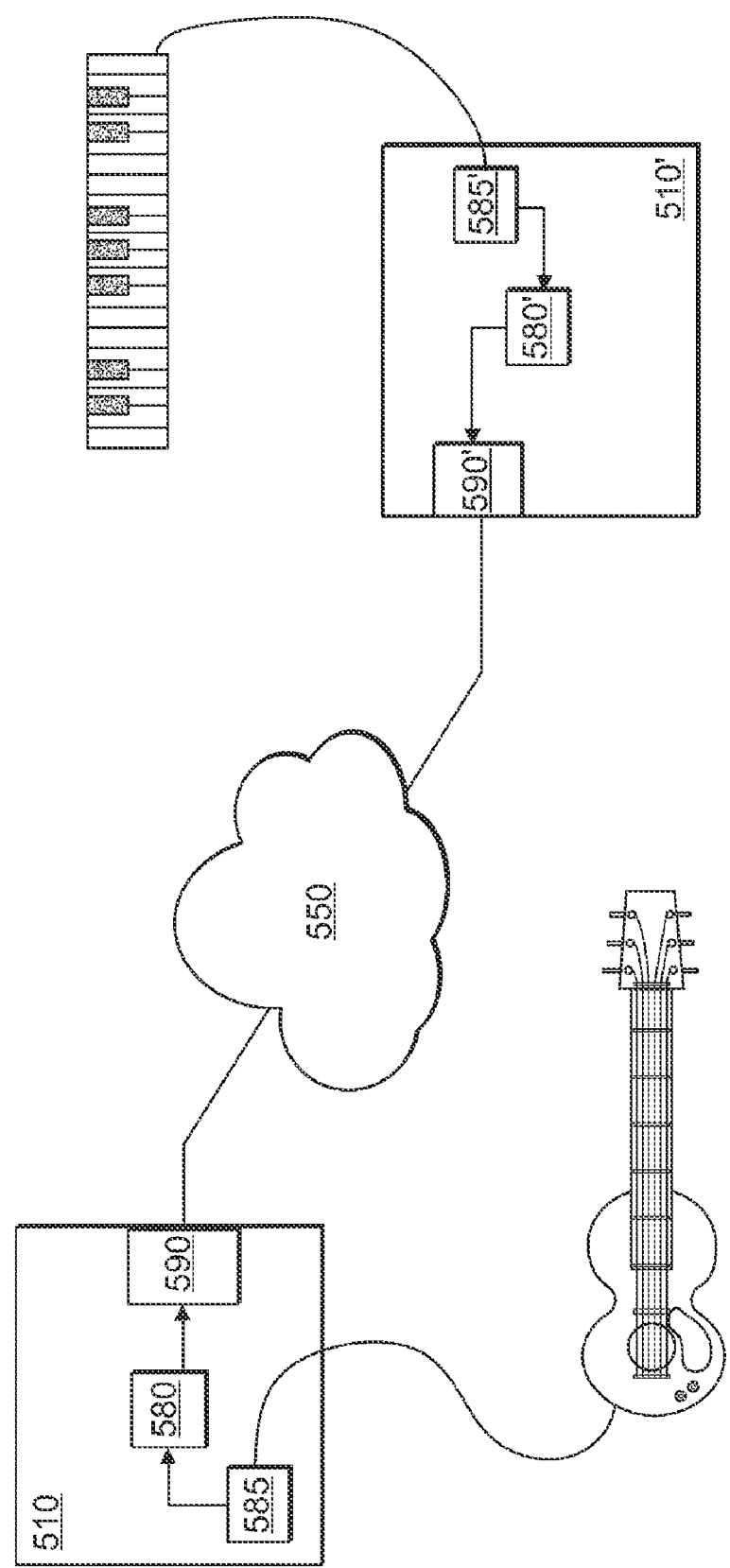
FIG. 5B is a block diagram depicting one embodiment of a system facilitating remote play for a rhythm-action video game.

In some embodiments, one or more of the players may participate remotely. FIG. 5B depicts a block diagram of a system facilitating network play of a rhythm action game. As shown in FIG. 5, a first gaming platform 510 and a second gaming platform 510' communicate over a network 550, such as a local area network (LAN), a metropolitan area network (MAN), or a wide area network (WAN) such as the Internet or the World Wide Web. The gaming platforms connect to the network through one of a variety of connections including standard telephone lines, LAN or WAN links (e.g., T1, T3, 56 kb, X.25), broadband connections (e.g., ISDN, Frame Relay, ATM), and wireless connections (e.g., 802.11a, 802.11g, Wi-Max). The first gaming platform 510 and the second gaming platform 510' may be any of the types of gaming platforms identified above. In some embodiments, the first gaming platforms 510 and the second gaming platform 510' are of different types.

When a networked multiplayer game session begins at the direction of one of the players, that player's gaming platform 510 (the "host") transmits a "start" instruction to all other gaming platforms participating in the networked game, and the game begins on all platforms. A timer begins counting on each gaming platform, each player's game cues are displayed, and each player begins attempting to perform the musical composition.

Gameplay on gaming platform 510 is independent from game play on gaming platform 510', except that each player's gaming platform contains a local copy of the musical event data for all other players. The timers on the various gaming platforms communicate with each other via the network 550 to maintain approximate synchrony using any number of the conventional means known in the art.

The gaming platforms 510, 510' also continually transmit game score data to each other, so that each system (and player) remains aware of the game score of all other systems (and players). Similarly, this is accomplished by any number of means known in the art. Note that this data is not particularly timing sensitive, because if there is momentary disagreement between any two gaming platforms regarding the score (or similar game-related parameters), the consequences to gameplay are negligible.

In one embodiment, as each player plays the game at their respective location, an analyzer module 580, 580' on that player's gaming platform 510, 510' continually extracts data from an event monitor 585, 585' regarding the local player's performance, referred to hereafter as "emulation data". Emulation data may include any number of parameters that describe how well the player is performing. Some examples of these parameters include:

whether or not the most recent event type was a correctly-played note or an incorrectly-played noted;

a timing value representing the difference between actual performance of the musical event and expected performance of the musical event;

a moving average of the distribution of event types (e.g., the recent ratio of correct to incorrect notes);

a moving average of the differences between the actual performance of musical events and the expected performance times of the musical events; or a moving average of timing errors of incorrect notes.

Each analyzer module 580, 580' continually transmits the emulation data it extracts over the network 550 using transceiver 590, 590'; each event monitor 585, 585' continually receives the other gaming platform's emulation data transmitted over the network 550.

In one embodiment, the emulation data essentially contains a statistical description of a player's performance in the recent past. The event monitor 585, 585' uses received emulation data to create a statistical approximation of the remote player's performance.

In one particular example, an incoming emulation parameter from a remote player indicates that the most recent remote event was correctly reproduced. When the local event monitor 585, 585' reaches the next note in the local copy of the remote player's note data, it will respond accordingly by "faking" a successfully played note, triggering the appropriate sound. That is, the local event monitor 585, 585' will perform the next musical event from the other players' musical event data, even though that event was not necessarily actually performed by the other player's event monitor 585, 585'. If instead the emulation parameter had indicated that the most recent remote event was a miss, no sound would be triggered.

In another particular example, an incoming emulation parameter from a remote player indicates that during the last 8 beats, 75% of events were correctly reproduced and 25% were not correctly reproduced. When the local event monitor 585 reaches the next note in the local copy of the remote player's note data, it will respond accordingly by randomly reproducing the event correctly 75% of the time and not reproducing it correctly 25% of the time.

In another particular example, an incoming emulation parameter from a remote player indicates that during the last 4 beats, 2 events were incorrectly performed, with an average timing error of 50 "ticks." The local event monitor 585, 585' will respond accordingly by randomly generating incorrect events at a rate of 0.5 misses-per-beat, displacing them in time from nearby notes by the specified average timing error.

The above three cases are merely examples of the many types of emulation parameters that may be used. In essence, the remote player performances are only emulated (rather than exactly reproduced) on each local machine.

In this embodiment, the analyzer module 580, 580' may extract musical parameters from the input and transmit them over a network 550 to a remote gaming platform. For example, the analyzer module 580, 580' may simply transmit the input stream over a network 550 or it may extract the information into a more abstract form, such as "faster" or "lower." Although described in the context of a two-player game, the technique may be used with any number of players.

Still referring to FIG. 5B, in another embodiment, analyzer module 580, 580' extracts data from the event monitor 585, 585' regarding the local player's performance. In this embodiment, however, the extracted data is transmitted over the network 550 using the transceiver 590, 590'. When the analyzer 580, 580' receives the transmitted data, it generates an emulation parameter representing the other player's musical performance and provides the locally-generated emulation parameter to the event monitor 585, 585', as described above. One advantage of this embodiment is that each player may locally set their preference for how they want the event monitor 585, 585' to act on emulation parameters.

In other embodiments, the transmitted data is associated with a flag that indicates whether the transmitted data represents a successfully executed musical event or an unsuccessfully executed musical event. In these embodiments, the analyzer 580, 580' provides a locally-generated emulation parameter to the event monitor 585, 585' based on the flag associated with the transmitted data.

One unusual side effect of these techniques is that each local player does not hear an exact reproduction of the remote players' performances; only a statistical approximation. However, these statistical approximations have two countervailing positive attributes: because they are synchronized to the local player's timer and the local copy of the remote players' note data, they are synchronous with the local player's performance; and while not exact reproductions, they are "close enough" to effectively communicate to the local player the essence of how well the remote players are performing musically. In this model, delays in the transmission of the data over the network 550 do not have the intolerable side effect of causing cacophonous asynchronicity between the note streams triggering sounds on each player's local system.

Figure 5C:
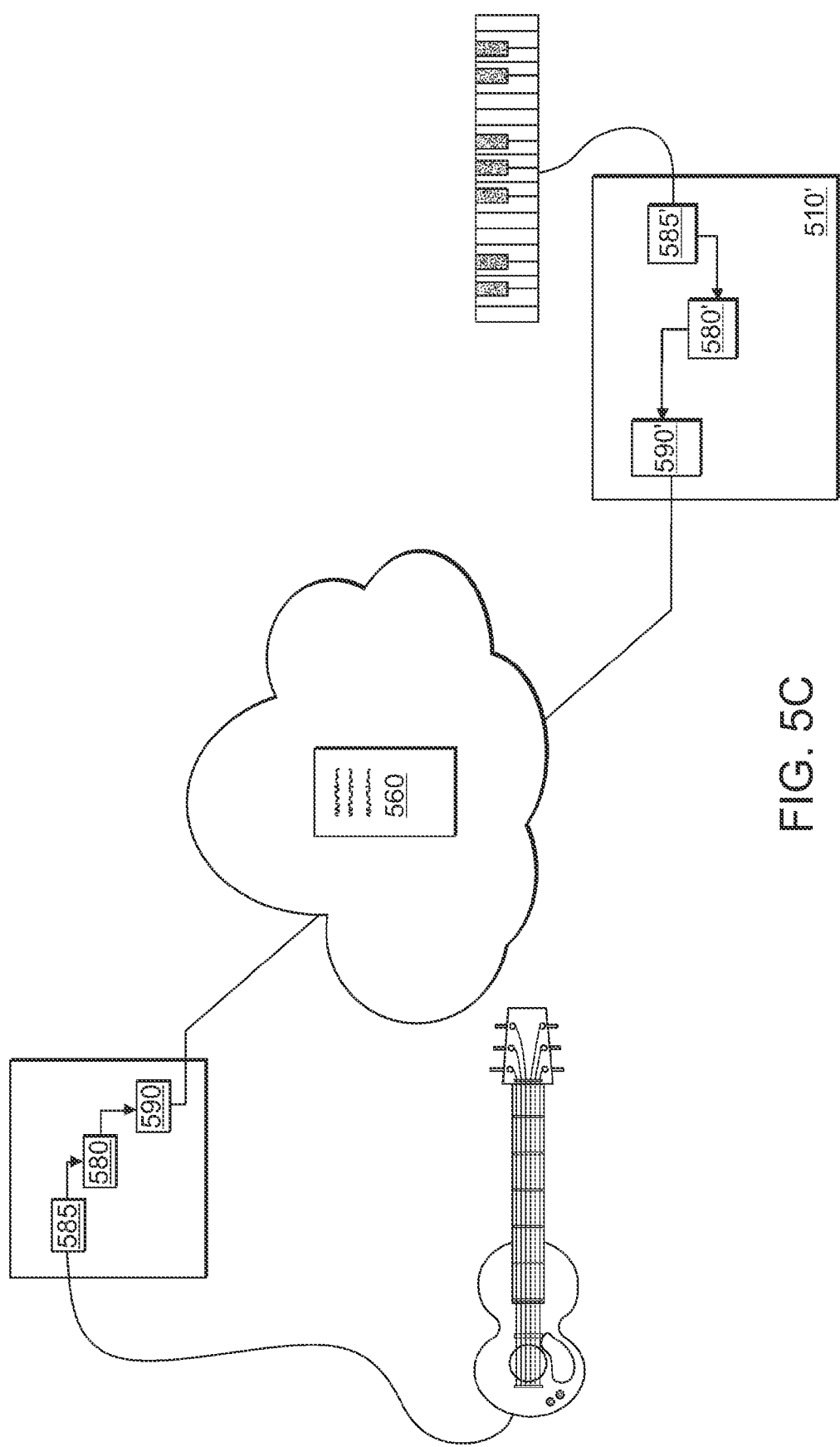
FIG. 5C is a block diagram depicting another embodiment of a system facilitating remote play for a rhythm-action video game.

FIG. 5C depicts a block diagram of another embodiment of a system facilitating network play of a rhythm action game. As shown in FIG. 5C a central server 560 may be used to facilitate communication between the gaming platforms 510, 510'. Extraction of emulation parameters is performed, as described above. The server 560 distributes data, whether music performance data or emulation parameter data, to all other gaming platforms participating in the current game. In other embodiments, the server 560 may store received data for use later. For example, a band may elect to use the stored data for the performance of a band member who is unavailable to play in a specific game.

Figure 6:
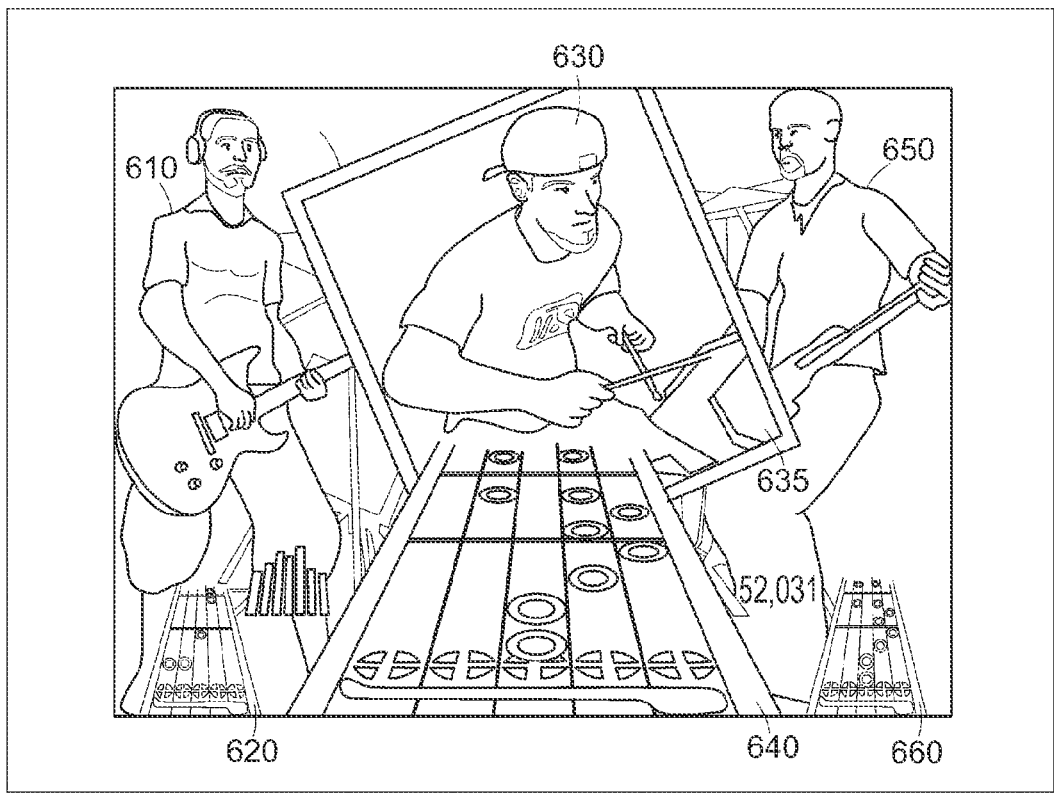
FIG. 6 is a screen shot depicting one embodiment of a screen display for remote head-to-head competition in a video game.

Referring now to FIG. 6, one embodiment of a screen display for remote single player play is shown. As shown in FIG. 6, the local player's avatar 630 is highlighted, in FIG. 6 by a bright, box 635 cocked at an angle to other elements on the screen. The avatars 610, 650 for remote players appear normally. As shown in FIG. 6, the lanes 620, 660 associated with the remote players are shown smaller than the local player's lane 640. The embodiment of the screen display shown in FIG. 6 may be used for head-to-head play, for simultaneous competition, and for cooperative play.

In some embodiments, multiple players participate in an online face-off between two bands. A "band" is two or more players that play in a cooperative mode. In some embodiments, the two bands need to have the same types of instruments at the same difficulty level selection, i.e., a guitarist playing on "hard" and a bassist playing on "medium" playing against a guitarist playing on "hard" and a bassist playing on "medium." In other embodiments, the two bands still need to have the same types of instruments but the difficulty selections can be different: Players participating at a lower difficulty level simply have fewer gems to contribute to the overall score. The song to be played may be selected after the teams have been paired up. Alternatively, a band may publish a challenge to play a particular song and a team may accept the challenge.

Referring back to FIG. 3, one embodiment of competitive online play is depicted. In this embodiment, the local group of players has formed a band called "The Freqs." As shown in FIG. 3, each of the four players in the "The Freqs" is local to one another. They are competing against a team of players located remotely, who have formed a band called "The Champs." As shown in FIG. 3, each of the "The Freqs" is represented by one of the avatars 210, 230, 250, 270. As shown in FIG. 3, their score 380 is displayed, as is the score of the competing band 385, "The Champs." In some embodiments, the bands "trade" alternating portions of the musical composition to perform, that is, the performance of the song alternates between bands. In these embodiments, musical; performance output from "The Champs" is reproduced locally at the gaming platform used by "The Freqs" when "The Champs" are performing. Similarly, the musical performance of "The Freqs" is reproduced remotely (using the emulation parameter technique described above) at the gaming platform of "The Champs" when "The Freqs" are performing. In other embodiments, the bands play simultaneously. In these embodiments, the displayed score may be the only feedback that "The Freqs" are provided regarding how well "The Champs" are performing.

In some particular embodiments, members of cooperating bands may be local to one another or remote from one another. Similarly, members of competing bands may be local to one another or remote from one another. In an extreme example, each player is remote from every other player.

In some embodiments, players may form persistent bands. In these embodiments, those bands may only compete when at least a majority of the band in available online. In some of the embodiments, if a member of a persistent band in not online, and the other band members want to compete, a gaming platform may substitute for the missing band member. Alternatively, a player unaffiliated with the band may substitute for the missing band member. In still other embodiments, a stream of emulation parameters stored during a previous performance by the missing band member may be substituted for the player.

In other embodiments, an online venue may be provided allowing players to form impromptu bands. Impromptu bands may dissolve quickly or they may become persistent bands.

The present invention (including without limitation, the timer 340, and the event monitor 320) may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable readable programs may be implemented in any programming language, LISP, PERL, C, C++, PROLOG, or any byte code language such as JAVA. The software programs may be stored on or in one or more articles of manufacture as object code.

Having described certain embodiments of the invention, it will now become apparent to one of skill in the art that other embodiments incorporating the concepts of the invention may be used. Although the described embodiments relate to the field of rhythm-action games, the principles of the invention can extend to other areas that involve musical collaboration or competition by two or more users connected to a network. Therefore, the invention should not be limited to certain embodiments, but rather should be limited only by the spirit and scope of the following claims.

What is claimed is:

1. A method for facilitating real-time interaction between players of a game, the method comprising the steps of:
    (a) receiving first music performance input data from a local player of a rhythm-action game, the first music performance input data representing a first musical performance;
    (b) generating audio output responsive to the received first music performance input;
    (c) receiving, via a network, second music performance input data from a remote player of a rhythm-action game, the received second music performance input data representing a non-emulated musical performance by the remote player;
    (d) creating emulation data from the received second music performance input data; and
    (e) generating a local approximation of the remote musical performance using the created emulation data, the local approximation synchronous with the local musical performance.

2. The method of claim 1 wherein step (a) comprises receiving music performance input data from a local player using a gamepad.

3. The method of claim 1 wherein step (a) comprises receiving music performance input data from a local player using one of a simulated musical instrument, simulated guitar, simulated drum, musical keyboard, simulated turntable, and a simulated microphone.

4. The method of claim 1 wherein step (b) comprises playing a note to indicate a successful input.

5. The method of claim 1 wherein step (b) comprises playing a stream of audio to indicate a successful input.

6. The method of claim 1 wherein step (b) comprises playing an error tone to indicate unsuccessful input.

7. The method of claim 1 wherein step (c) comprises receiving from an interim server second music performance input data from a remote player, the received second music performance input data representing a musical performance by the remote player.

8. The method of claim 1 wherein step (e) comprises playing a note to indicate a successful input.

9. The method of claim 1 wherein step (e) comprises playing a stream of audio to indicate a successful input.

10. The method of claim 1 wherein step (e) comprises playing an error tone to indicate unsuccessful input.

11. The method of claim 1 wherein step (d) comprises creating emulation data comprising a moving average of timing deltas between received second music performance events and expected timing of the second music performance events.

12. The method of claim 1 wherein step (d) comprises creating emulation data comprising a moving average of received second music performance events.

13. A method for facilitating real-time interaction between players of a game, the method comprising the steps of:
    (a) receiving, via a network, music performance input data from a remote player of a rhythm-action game, the received music performance input data representing a non-emulated musical performance by the remote player;
    (b) creating emulation data from the received music performance input data; and
    (c) generating a local approximation of the remote musical performance using the created emulation data, the local approximation synchronous with a local musical performance.

14. The method of claim 13 wherein step (a) comprises receiving from an interim server music performance input data from a remote player, the received music performance input data representing a musical performance by the remote player.

15. The method of claim 13 wherein step (b) comprises creating emulation data comprising a moving average of timing deltas between received music performance events.

16. The method of claim 13 wherein step (b) comprises creating emulation data comprising a moving average of received music performance events.

17. A computer program product, tangibly embodied in a computer-readable storage medium, for facilitating real-time interaction between players of a game, the computer program product including instructions operable to cause a game platform to:
  (a) receive, via a controller in communication with the game platform, first music performance input data from a local player of a rhythm-action game, the first music performance input data representing a first musical performance;
  (b) generate, via a speaker in communication with the game platform, audio output responsive to the received first music performance input;
  (c) receive, via a network connection of the game platform, second music performance input data from a remote player of a rhythm-action game, the received second music performance input data representing a non-emulated musical performance by the remote player;
  (d) create emulation data from the received second music performance input data; and
  (e) generate a local approximation of the remote musical performance using the created emulation data, the local approximation synchronous with the local musical performance.

* * * * *